(12) United States Patent
Beers et al.

(10) Patent No.: US 9,656,343 B2
(45) Date of Patent: May 23, 2017

(54) ARTICLE INCLUDING A WELD JOINT

(71) Applicant: Hamilton Sundstrand Corporation, Windsor Locks, CT (US)

(72) Inventors: Craig M. Beers, Wethersfield, CT (US); Victoria S. Richardson, East Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 211 days.

(21) Appl. No.: 14/693,405

(22) Filed: Apr. 22, 2015

(65) Prior Publication Data

US 2015/0224593 A1 Aug. 13, 2015

Related U.S. Application Data

(62) Division of application No. 13/443,667, filed on Apr. 10, 2012.

(51) Int. Cl.
| | |
|---|---|
| *B23K 15/00* | (2006.01) |
| *B23K 15/04* | (2006.01) |
| *B23K 33/00* | (2006.01) |
| *B22D 25/00* | (2006.01) |

(52) U.S. Cl.
CPC ......... *B23K 15/0053* (2013.01); *B22D 25/00* (2013.01); *B23K 15/0006* (2013.01); *B23K 15/0033* (2013.01); *B23K 15/0093* (2013.01); *B23K 33/004* (2013.01); *Y10T 428/12764* (2015.01)

(58) Field of Classification Search
CPC ................ B23K 15/00; B23K 15/0006; B23K 15/0093; B23K 15/04

USPC ............ 219/121.12, 121.13, 121.14, 121.35
See application file for complete search history.

(56) References Cited

U.S. PATENT DOCUMENTS

| | | | | |
|---|---|---|---|---|
| 1,993,430 | A | * | 3/1935 | Bell ........................ F16D 65/10 |
| | | | | 188/218 R |
| 3,159,419 | A | | 12/1964 | Kerby |
| 4,907,736 | A | | 3/1990 | Doble |
| 4,938,501 | A | | 7/1990 | Wipasuramonton |
| 5,360,232 | A | | 11/1994 | Lowe et al. |
| 6,076,725 | A | | 6/2000 | Imamura et al. |

(Continued)

FOREIGN PATENT DOCUMENTS

| | | |
|---|---|---|
| CN | 101073852 | 11/2007 |
| CN | 101486130 | 7/2009 |

(Continued)

OTHER PUBLICATIONS

Office Action issued in CN201310251095.6; Dec. 26, 2014; 8 pages.

(Continued)

*Primary Examiner* — Samuel M Heinrich
(74) *Attorney, Agent, or Firm* — Cantor Colburn LLP

(57) ABSTRACT

An article is provided and includes a first part having a first edge defined at an intersection of first and second surfaces where the first and second surfaces form a first angle, a second part having a second edge defined at an intersection of third and fourth surfaces where the third and fourth surfaces form a second angle which is different from the first angle and a weld joint formed at locations where the first surface contacts the third surface.

12 Claims, 3 Drawing Sheets

(56) References Cited

U.S. PATENT DOCUMENTS

| | | |
|---|---|---|
| 6,261,701 B1 | 7/2001 | Fields, Jr. |
| 6,489,583 B1 | 12/2002 | Nowak et al. |
| 6,886,522 B1* | 5/2005 | Lawrence ................ F02F 1/40 123/195 R |
| 6,998,570 B1 | 2/2006 | Watkins et al. |
| 7,244,320 B2 | 7/2007 | Malley et al. |
| 7,373,857 B2 | 5/2008 | Dion et al. |
| 7,740,162 B2 | 6/2010 | Ilyushenko et al. |
| 7,841,507 B2 | 11/2010 | Kempa et al. |
| 7,854,064 B2 | 12/2010 | Malley |
| 7,858,897 B2 | 12/2010 | Beranger |
| 8,114,528 B2 | 2/2012 | Ishikawa et al. |
| 2005/0230948 A1 | 10/2005 | Al-Amin |
| 2007/0283560 A1 | 12/2007 | Malley |
| 2010/0180417 A1 | 7/2010 | Anantharaman et al. |
| 2011/0024398 A1 | 2/2011 | Belanger |
| 2011/0031223 A1 | 2/2011 | Belanger |
| 2011/0220622 A1 | 9/2011 | McClay et al. |
| 2012/0027506 A1 | 2/2012 | Yahaba |
| 2012/0222645 A1* | 9/2012 | Edel ................ F02F 3/003 123/193.6 |

FOREIGN PATENT DOCUMENTS

| | | |
|---|---|---|
| CN | 102151958 | 8/2011 |
| CN | 102395443 A | 3/2012 |
| CN | 102112263 A | 7/2014 |
| JP | 2004283883 | 10/2004 |
| JP | 2009012016 | 1/2009 |
| SU | 1021544 | 6/1983 |

OTHER PUBLICATIONS

Translation of CN Office Action Issued in CN201310251092.6, Dec. 26, 2014; 9 pages.

Translation of CN Search Report issued in CN201310251092.6; Dec. 26, 2014; 3 pages.

State Intellectual Property Office of People's Republic China Search Report; Application No. 201310251092.6; Dated Dec. 17, 2014; 3 pages.

* cited by examiner

ARTICLE INCLUDING A WELD JOINT

CROSS REFERENCE TO RELATED APPLICATION

This application is a Divisional of U.S. application Ser. No. 13/443,667 filed Apr. 10, 2012, the disclosures of which are incorporated by reference herein.

BACKGROUND OF THE INVENTION

The subject matter disclosed herein relates to an article including a weld joint and, more particularly, to an article including first and second annular parts and an annular weld joint.

Weld joints are often used in various industrial applications to couple one part to another part. Compressor in an aircraft cabin air compressor is one such application in which weld joints are employed. The assembly includes a wrought annular part that is welded to a cast annular part in a hybrid configuration. The hybrid configuration is used because, while the wrought annular part is often provided in a relatively simple shape, the cast part may be provided in with a more complex geometry that would be difficult to form without casting.

With the hybrid configuration, the weld joint is formed by an electron beam (EB) weld process that has been found to be effective at coupling wrought parts with cast parts such that the weld joint is integrally strengthened. Generally, EB welding is achieved by aiming a very small stream of electrons at the location where the EB weld joint is desired. This allows the EB weld joint to form while minimizing a size of the heat affected zone (HAZ) adjacent to the weld. By keeping the size of the HAZ small, a number of defects in the cast part can also be minimized.

Although the EB welding process can be effective in forming relatively thin EB weld joints with few defects in the cast part, it has been found that EB weld joints tend to form increased numbers of defects in cast parts for relatively thick joints where significant heat and large HAZs are generated. Typically, this observation led researchers to design the mirrored hybrid configuration of FIG. 1 in which the wrought part 1 has a protrusion 2, which is welded to an end 3 of the cast part 4. As shown in FIG. 1, the corresponding angles, α1 and α2, are mirrored such that a thickness of the end 3 is limited to the thickness of the protrusion 2. Nevertheless, excessive numbers of defects are still typically found in the cast part 4 due to stresses incurred in the welding process and it is often necessary to replace the cast part 4 during servicing.

BRIEF DESCRIPTION OF THE INVENTION

According to one aspect of the invention, an article is provided and includes a first part having a first edge defined at an intersection of first and second surfaces where the first and second surfaces form a first angle, a second part having a second edge defined at an intersection of third and fourth surfaces where the third and fourth surfaces form a second angle which is different from the first angle and a weld joint formed at locations where the first surface contacts the third surface.

According to another aspect of the invention, an article is provided and includes a first annular part having first and second surfaces and a first edge defined at an intersection of the first and second surfaces, the first surface being an annular, radially outwardly facing surface, a second annular part having third and fourth surfaces and a second edge defined at an intersection of the third and fourth surfaces, the third surface being an annular, radially inwardly facing surface and an annular weld joint formed at locations where the first surface contacts the third surface such that the second and fourth surfaces are disposed at an angle with respect to one another.

According to yet another aspect of the invention, a method of forming an article is provided and includes forming a wrought first part having a first edge defined at an intersection of first and second surfaces where the first and second surfaces form a first angle, casting a second part having a second edge defined at an intersection of third and fourth surfaces where the third and fourth surfaces form a second angle which is different from the first angle and electron beam welding the first surface and the third surface.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying figures in which:

The detailed description explains embodiments of the invention, together with advantages and features, by way of example with reference to the figures.

DETAILED DESCRIPTION OF THE INVENTION

As mentioned above, the need to reduce defects in cast parts of hybrid configurations of weld joints led researchers to design mirrored hybrid configurations that were characterized by portions of cast parts being thinned to mirror the shapes of corresponding portions of wrought parts. It was believed that doing so would limit the numbers of defects resulting from the welding process but, in fact, the mirrored hybrid configurations continued to exhibit excessive numbers of defects. In accordance with aspects of the present invention, a counter-intuitive solution is proposed whereby the cast part is tapered toward the weld joint and therefore does not mirror the shape of the wrought part at all. Indeed, a thickness of the cast part is actually increased at or near the weld joint location.

Figure 1:
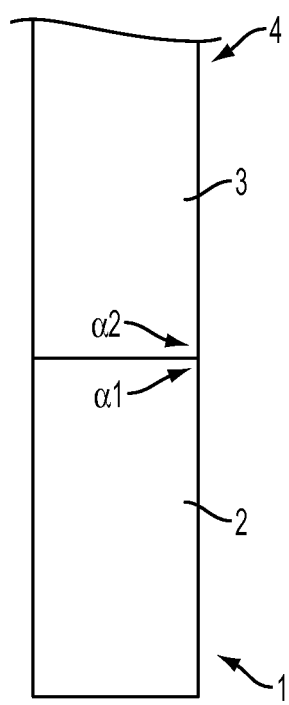
FIG. 1 is a side view of a weld joint in accordance with prior art configurations.
Figure 2:
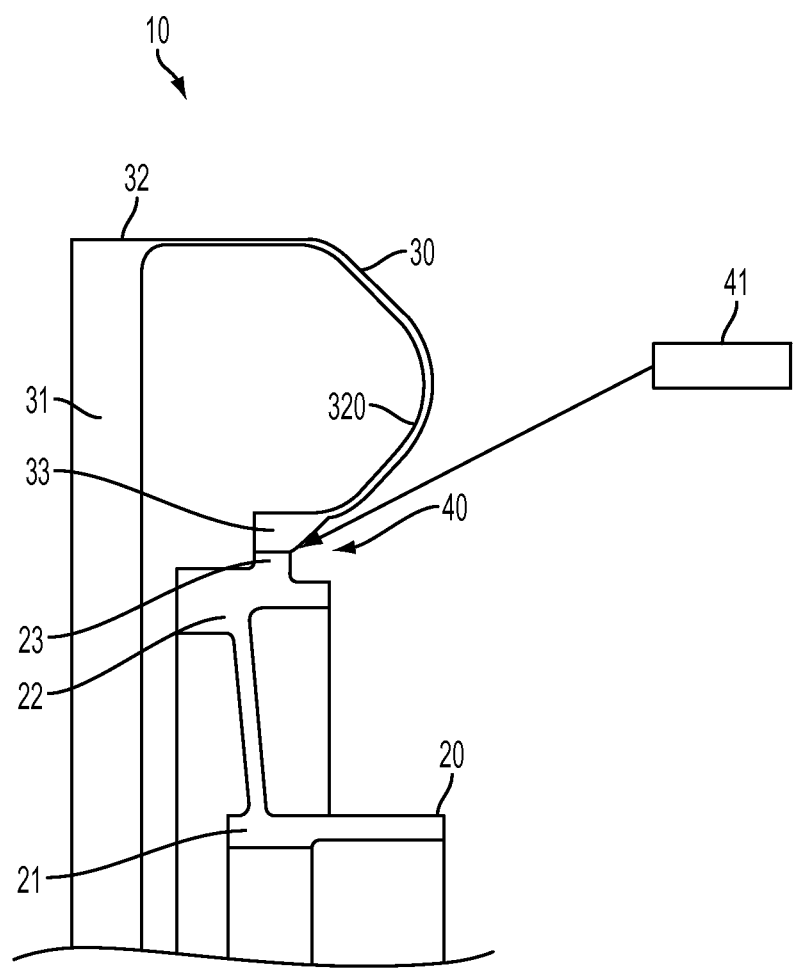
FIG. 2 is a side view of a weld joint in accordance with embodiments of the invention.
Figure 3:
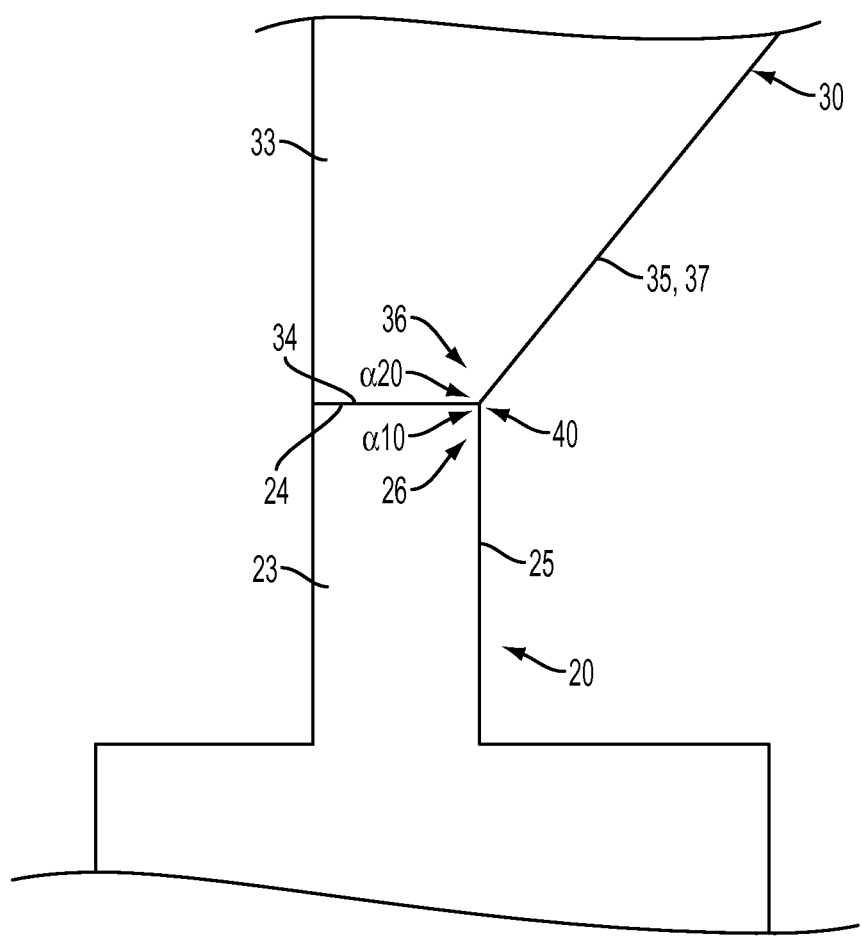
FIG. 3 is an enlarged view of the weld joint of FIG. 2.

That is, with reference to FIGS. 2 and 3, an article 10 is provided and may be, for example, a portion of a compressor housing of an aircraft cabin air compressor. The article 10 includes a first annular part 20, a second annular part 30 and a weld joint 40 at a junction of the first annular part 20 and the second annular part 30. The first annular part 20 may be formed from aluminum, other similar metals and/or alloys thereof and is a wrought formed part. The second annular part 30 may be formed from aluminum, other similar metals and/or alloys thereof and is a cast part. Though, the first and second annular parts 20 and 30 are matched in terms of certain geometric characteristics (i.e., a common thickness along the weld joint 40), the casting of the second annular part 30 may result in the second annular part 30 being less ductile that the first annular part 20.

The first annular part 20 has a central annular body 21 and an outer annular flange 22 that is supportively disposed at an outer radial portion of the central annular body 21. The outer annular flange 22 includes an annular protrusion 23, which has a first surface 24 (see FIG. 3), a second surface 25 (see FIG. 3) and a first edge 26 (see FIG. 3). The first edge 26 is defined at an intersection of the first surface 24 and the second surface 25 where the first surface 24 and the second surface 25 define a first angle α10 (see FIG. 3).

The second annular part 30 includes a planar section 31 and an annular end section 32 having a curvi-linear cross section 320. At an end of the curvi-linear cross section 320, the annular end section 32 includes a bulbous annular section 33, which has a third surface 34 (see FIG. 3), a fourth surface 35 (see FIG. 3) and a second edge 36 (see FIG. 3). The second edge 36 is defined at an intersection of the third surface 34 and the fourth surface 35 where the third surface 34 and the fourth surface 35 define a second angle α20 (see FIG. 3).

In general, as shown in FIG. 3, the first angle α10 and the second angle α20 are different from one another. More particularly, the first angle α10 may be defined as a substantially right angle and the second angle α20 may be defined as a non-right angle. As such, the bulbous annular section 33 has a tapered surface 37 that effectively increases a thickness of the bulbous annular section 33 with increasing radial distance from the weld joint 40. This effective increase in thickness of the bulbous annular section 33 locally strengthens the second annular part 30 and thereby reduces a number of defects formed therein as a result of the welding process.

The weld joint 40 may be formed as an electron beam (EB) weld joint. This is accomplished by disposing the second annular part 30 about the first annular part 20 such that the first surface 24 circumferentially registers with the third surface 34. A tool 41 (see FIG. 2), which is configured to emit a stream of electrons, is then disposed proximate to the desired weld joint location. Once the tool 41 is activated, the tool 41 is moved in an annular pattern similar to the shape of the desired weld joint while the tool 41 emits a stream of electrons that locally heat the first surface 24 and the third surface 34 such that the weld joint 40 is annularly formed.

Following the weld joint 40 formation, the second surface 25 is formed to be disposed at a non-right angle with respect to the fourth surface 35 such that a normal angle of the fourth surface 35 is transversely oriented relative to a normal angle of the second surface 25 at any given circumferential location of the weld joint 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of forming an article, comprising:
   forming a wrought first part having a first edge defined at an intersection of first and second surfaces where the first and second surfaces form a first angle;
   casting a second part having a second edge defined at an intersection of third and fourth surfaces where the third and fourth surfaces form a second angle which is different from the first angle; and
   electron beam welding the first surface and the third surface.

2. The method according to claim 1, wherein the forming of the wrought first part comprises forming the wrought first part as an annular part and the casting of the second part comprises casting the second part as an annular part.

3. The method according to claim 2, wherein the second angle is larger than the first angle.

4. A method of forming an article, the method comprising:
   forming a first annular wrought part having first and second surfaces and a first edge defined at an intersection of the first and second surfaces, the first surface being an annular, radially outwardly facing surface;
   casting a second annular part having third and fourth surfaces and a second edge defined at an intersection of the third and fourth surfaces, the third surface being an annular, radially inwardly facing surface; and
   electron beam welding the first surface and the third surface to form an annular weld joint at locations where the first surface contacts the third surface such that the weld joint is disposed at a junction of the first part and the second part and the second and fourth surfaces are disposed at an angle with respect to one another.

5. The method according to claim 4, wherein at least one of the first and second annular parts comprises aluminum.

6. The method according to claim 4, wherein a normal angle of the fourth surface is transversely oriented relative to a normal angle of the second surface.

7. The method according to claim 4, wherein the first and second annular parts have a common central longitudinal axis and the first annular part comprises:
   a central annular body; and
   an outer annular flange supportively disposed at an outer radial portion of the central annular body.

8. The method according to claim 7, wherein the outer annular flange comprises an annular protrusion at which the first surface faces away from the common central longitudinal axis only in a radially outward direction and at which first and second surfaces define the first edge.

9. The method according to claim 4, wherein an angle formed by the first and second surfaces at the first edge is a substantially right angle.

10. The method according to claim 4, wherein the first and second annular parts have a common central longitudinal axis and the second annular part comprises:
    a planar section; and
    an annular end section having a curvi-linear cross section.

11. The method according to claim 10, wherein the annular end section comprises a bulbous annular section at which the third surface faces away from the common central longitudinal axis only in a radially inward direction and at which the third and fourth surfaces define the second edge.

12. The method according to claim 4, wherein an angle formed by the first and second surfaces at the first edge is a substantially right angle and an angle formed by the third and fourth surfaces at the second edge is obtuse.

* * * * *